United States Patent [19]  [11] Patent Number: 4,939,611
Connolly  [45] Date of Patent: Jul. 3, 1990

[54] VERTICAL DISPLACEMENT LIMIT STOP IN A DISK DRIVE FOR PREVENTING DISK SURFACE DAMAGE

[75] Inventor: Richard P. Connolly, Boise, Id.

[73] Assignee: Hewlett-Packard Company, Palo Alto, Calif.

[21] Appl. No.: 260,621

[22] Filed: Oct. 20, 1988

[51] Int. Cl.⁵ .................. G11B 5/54; G11B 21/22; G11B 21/08

[52] U.S. Cl. ........................ 360/128; 360/104; 360/105; 360/106; 360/137

[58] Field of Search .............. 360/104, 105, 106, 128, 360/137

[56] References Cited

U.S. PATENT DOCUMENTS 4,408,238 10/1983 Hearn ................................ 360/104
4,724,500  2/1988 Dalziel ................................ 360/104
4,800,455  1/1989 Takizawa .......................... 360/104

Primary Examiner—Robert S. Tupper

[57] ABSTRACT

A vertical displacement limit stop or a crash stop is provided in a disk drive for preventing contact of the work function members such as air vanes or the arms of an armstack, or the flexure members, when the actuator is in locked position, with adjacent track surfaces of the disks, in the presence of shock forces. Vertical displacement stops on the work function members each have an impact face which confronts an adjacent surface of a disk. These impact faces each project above any other part of the associated work function member in a position overlapping and confronting the surface of a disk at its outer peripheral edge, outside of tracks recorded on the disk, to prevent other parts of the work function member from contacting the surface of a disk in an area in which tracks are recorded.

6 Claims, 6 Drawing Sheets

VERTICAL DISPLACEMENT LIMIT STOP IN A DISK DRIVE FOR PREVENTING DISK SURFACE DAMAGE

BACKGROUND OF THE INVENTION

1. Field of the Invention

This invention relates generally to vertical displacement limit stops in a disk drive and more particularly to vertical displacement limit stops or crash stops, as opposed to actuator limit stops, for preventing impact between a disk surface and a work function member, such as the arm of an armstack, or an air vane, projecting between adjacent disks.

2. Description of the Prior Art

Prior art limit stops or crash stops in disk memory drives have addressed the problem of providing mechanical limits to actuator arm travel in moving armstacks of magnetic heads across tracks of magnetic recordings in magnetic memory disks. Other prior art, has addressed the problem of locking the actuator arm in a predetermined position with respect to the magnetic memory disks, with the magnetic heads positioned at a location on the disk surface where there are no recorded tracks.

The actuator arm lock is particularly useful in instances when the disk drive is being moved, as in shipping or handling, where the disk drive is subject to shock. The heads on the armstack of a free moving actuator arm can damage a disk surface as they sweep across the tracks in an uncontrolled manner. Destructive acceleration forces can also be imposed upon the armstack and the limit stops of the actuator arm if the actuator arm is not restrained or locked.

Efforts to meet the need for increased data storage in limited or reduced space in disk drives, have resulted in designs in which the axial spacing of the memory disks is being reduced. There are physical limits to size reductions in magnetic heads while still retaining functional utility and reliability. There are also physical limits to size reductions in the arms of armstacks which carry the magnetic heads and in their attachment points, while still maintaining the arm strength and stability required to properly move and position the heads. The result is that clearance between the armstack structure projecting between the adjacent disks is reduced. When the actuator arm is locked as in shipping, shock forces having force components paralleling the rotational axis of the disk, can cause relative movement between the disk stack and the armstack, in a direction substantially perpendicular to a disk surface producing impact between the armstack structure and a confronting surface of a disk. This can produce serious disk surface damage and data loss. Even if the data loss can be tolerated, the disk drive will be useless because during disk rotation the flying heads will not clear projections from the damaged disk surface. Destruction of the disk drive will likely result in this circumstance if use is attempted.

Presently known prior art neither addresses this problem nor suggests or provides a solution to this problem.

SUMMARY OF THE INVENTION

This invention provides a solution to this problem in the provision of a vertical displacement limit stop structure which provides for controlled impact between a selected part of a work function member, such as an arm of an armstack and a selected location on an adjacent surface of a magnetic memory disk. Since the displacements producing such impacts act in a direction substantially normal to the disk surfaces, which is defined as a vertical direction paralleling the disk spin axis, the limit stop is herein referred to as a vertical displacement limit stop.

In the transporting and handling of a disk memory drive, the actuator arm is locked in a predetermined position within the limits of its travel. This applies to both linear and rotary actuator arm structures. The locked position of the actuator arm which is usually selected, is one in which each magnetic head is located outside of the area in which tracks are recorded on the disk, such as that location in which the magnetic heads are located between the innermost track and the center of the disk outside of the data track area and flying area of the head during operation.

Actuator arm structures including armstacks differ in physical configuration. In disk drives having closely spaced disks, the arms projecting between the adjacent disks must be thin and flexible yet must be sufficiently stiff to provide the required bias against the flexible gimble mount for the head at the free extremity of the armstack arm, to insure engagement of the head with the memory disk, in a degree, that at disk rotational speed, will permit the head to lift and to fly on the thin film of air clinging to and moving with the disk surface.

Such flexible arms are commonly referred to as "flexures" and are mounted as cantilever beams. Being thin and light in weight and tapering from a wide base mounting face to a small width dimension at their free ends or tips, the flexures have a low moment of inertia and deflect very little in the presence of shock forces within the limits which are considered here. As a result, these flexures and the attached heads, do not present a problem with respect to disk surface damage in the extremes of acceleration forces for which the vertical limit stop of this invention is designed. Additionally, when the armstack is in the locked position, the head location inside the innermost track on the disk, obviates disk surface damage within the area of track recordings and head flight.

The base of each flexure is mounted in a structure called a comb, forming part of the armstack, which is secured to an actuator arm. In the locked position of the actuator arm, the teeth or fingers of the comb which are stiff, flat projections, project between the disks into the area of track recordings. The bases of the flexures are secured, as by head plates and screws, to the flat surfaces of the teeth of the comb. These flexure bases, when the disks are closely spaced, only slightly clear adjacent disk surfaces. Opposite face parts of these flexure bases which may contact an adjacent disk surface containing track recordings, due to shock forces in handling or transporting of the disk memory drive, include the head plates and/or projecting ends of the screws or screw heads thereat. In general, face parts is meant to include any prominent part of a surface of a part adjacent to and likely to contact a disk surface.

Shock forces, as used here, includes those forces having components of force acting in combinations causing, tilt of the disk stack axis, or tilt of the actuator arm axis, or bending of the disks, or bending of the actuator arm, or any combination of these. Each force introduces a component of displacement in a vertical direction, that is, paralleling the axis of rotation of the disks. It is desired that the vertical displacement limit stop provision be made to prevent damage to the track recording area of a memory disk of the disk memory drive in the presence of acceleration forces of not less that ninety (90) times the force of gravity, (90 G's).

This has been accomplished according to one specific embodiment of this invention in the provision of a limit stop member on the comb structure of an actuator, having a face or surface projecting above the highest point of the face parts of the flexures, especially at the flexure base between adjacent disks. The impact face or surface of each limit stop member overlaps the adjacent disk surface at its peripheral edge, well outside of the outermost track recording and the flying area of a magnetic head. Thus, upon relative movement between the memory disks and the armstack structure in a direction to cause contact therebetween, the faces of the limit stop members engage adjacent disk surfaces in a position outside of the area in which tracks are recorded or the heads fly. Selection of the area of the face of the limit stop members can be made to maintain the force per unit area acting on the disk sufficiently low in the extreme of shock forces for which limit stop projection is provided, to obviate disabling damage to any of the disks. The risk of damage to disk surfaces is also lessened by providing a surface on each limit stop member which is softer than the surface of the disk.

Drop tests which have been made on a limit stop structure of the type described, indicate that responsive shock forces having components normal to the disk surface, as high as 105 G's, acting over a time interval of 2.93 ms (about 55.5 in/sec. velocity change) may result only in a slight smudge on a disk surface where contacted by the face of a limit stop member. This shock response is significantly in excess of the goal of 90 G's which was desired.

According to another embodiment of this invention, a limit stop member may be mounted on each side or face of a vane which projects between the confronting surfaces of adjacent disks. Such vanes are sometimes used to introduce air turbulence in the regions downstream of the vanes in the direction of disk rotation. In still other instances, such vanes are used to scavenge air from the disks for the purpose of operating air actuated members, such as actuator arm locks.

In these applications, the vanes have opposite faces or sides which are in close proximity to the adjacent surfaces of the disks which, in the presence of shock, may contact the disk surfaces. To obviate damage in the area of the recorded tracks on the disk surfaces in such instances, a limit stop member such as described above may be applied to the vanes on opposite sides or faces thereof, in positions overlapping the outer peripheral edge of the disk, to make contact with the disk thereat in the presence of shock forces and to prevent damage to the recorded area of the disk.

Other features of this invention and their advantages will become apparent from a study of the following specification when considered in conjunction with the accompanying drawings, in which:

DESCRIPTION OF THE PREFERRED EMBODIMENT

Figure 1:
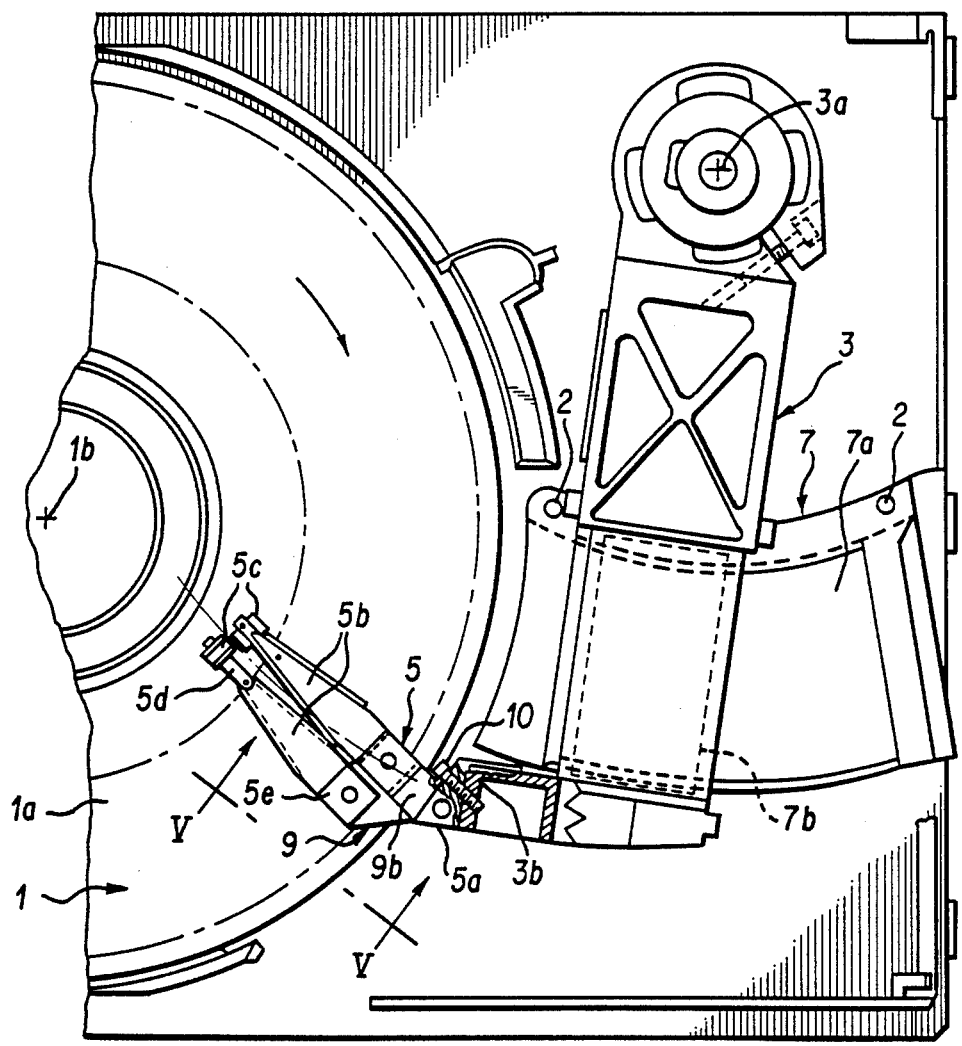
FIG. 1 is a plan view of a first embodiment of this invention showing a vertical limit stop installation on the rotary armstack actuator structure of a disk memory drive.

Referring to the plan view of this invention illustrated in FIG. 1, which is the presently preferred embodiment of this invention, there is illustrated a disk memory drive comprising a magnetic disk assembly or stack 1 adapted to be driven by a motor (not shown). The disks 1a of the disk stack are typically mounted in uniformly axially spaced positions along a spindle which is journalled to rotate about a central axis 1b.

An actuator arm 3 of the rotary actuator type is journalled to rotate about an axis 3a. The angular position of the actuator between limit stops 2 is controlled by an electromagnetic drive generally designated 7 which comprises a permanent magnet structure having an arcuate center pole 7a, the magnetic field of which links a coil 7b carried by the rotary actuator 3 and which surrounds the center pole 7a. The center pole 7a is arcuate in plan form, as seen, having its arc center at the axis 3a. A servo system (not shown) provides power for the coil to move the actuator between selected angular positions for track seeking and track following purposes. As seen, the actuator 3 is mounted in a position beside the magnetic disk stack so that its free end swings toward and away from the disk stack.

Figure 2:
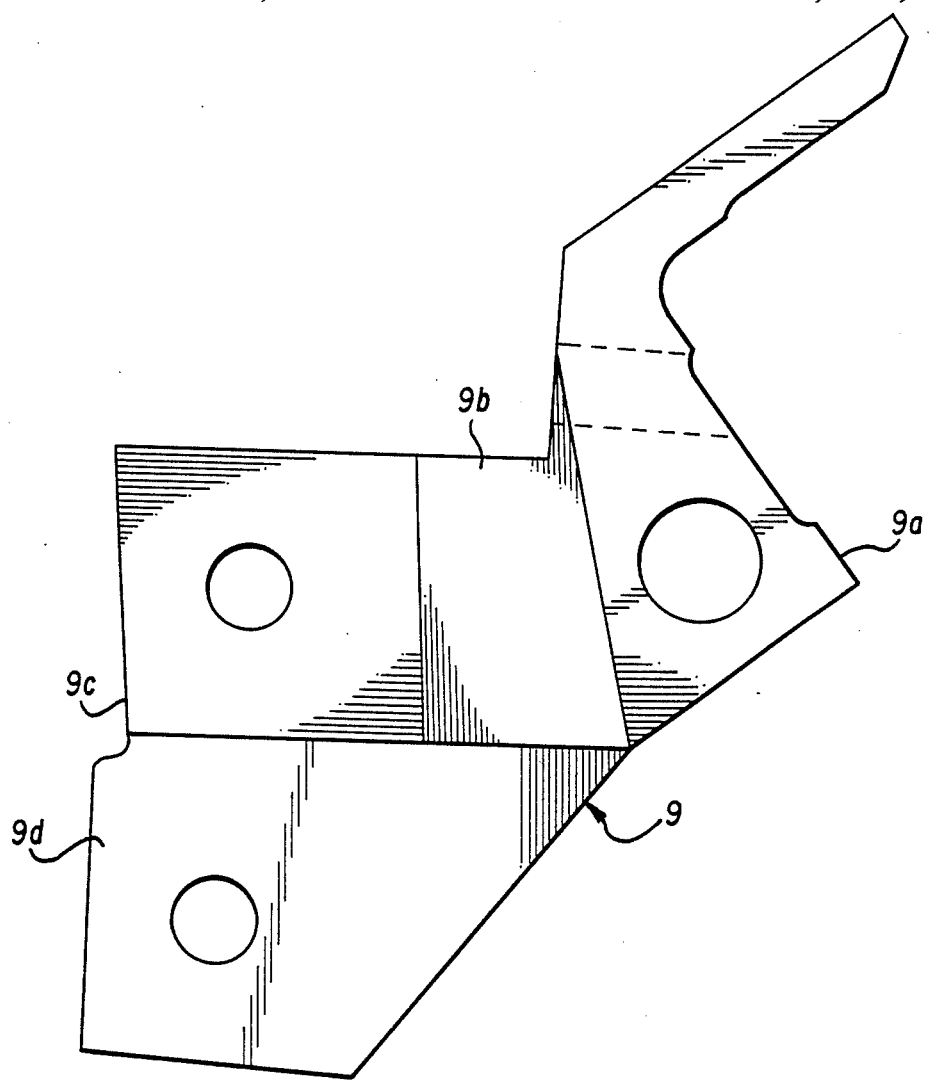
FIGS. 2 and 3 are enlarged plan and edge views, respectively, of a plate forming part of a comb structure which mounts the flexures and attached heads.
Figure 3:
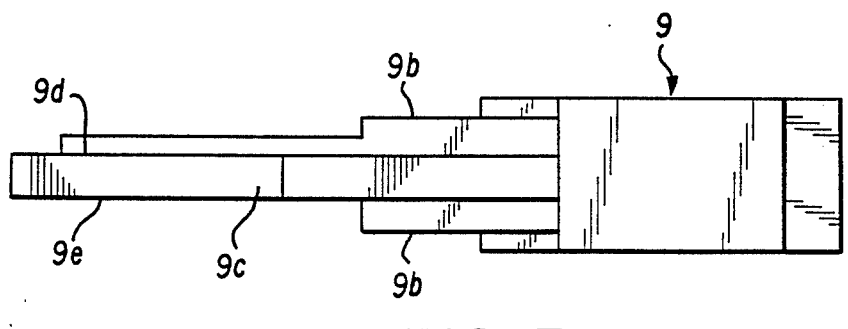

A lateral projection or arm 3b on the free end of the actuator 3 projects towards the disk stack. This lateral arm 3b forms part of a comb structure 5a which mounts the armstack 5. The comb structure 5a, a plan view of which is shown to an enlarged scale in FIG. 4, comprises individual flexure mounting plates, 9, FIGS. 2 and 3, which are drawn to the same scale as FIG. 4. These individual flexure mounting plates 9 comprise the teeth of the comb structure 5a. These flexure mounting plates have base portions 9a which are fitted into uniformly spaced slots 3c in the lateral arm 3b of the actuator 3. A screw 10 in each flexure mounting plate secures the flexure mounting plate to the lateral arm 3b. The spacing of the slots 3c is such that a line through the center of a flexure mounting, as viewed edgewise, is centered between the disks.

Figure 4:
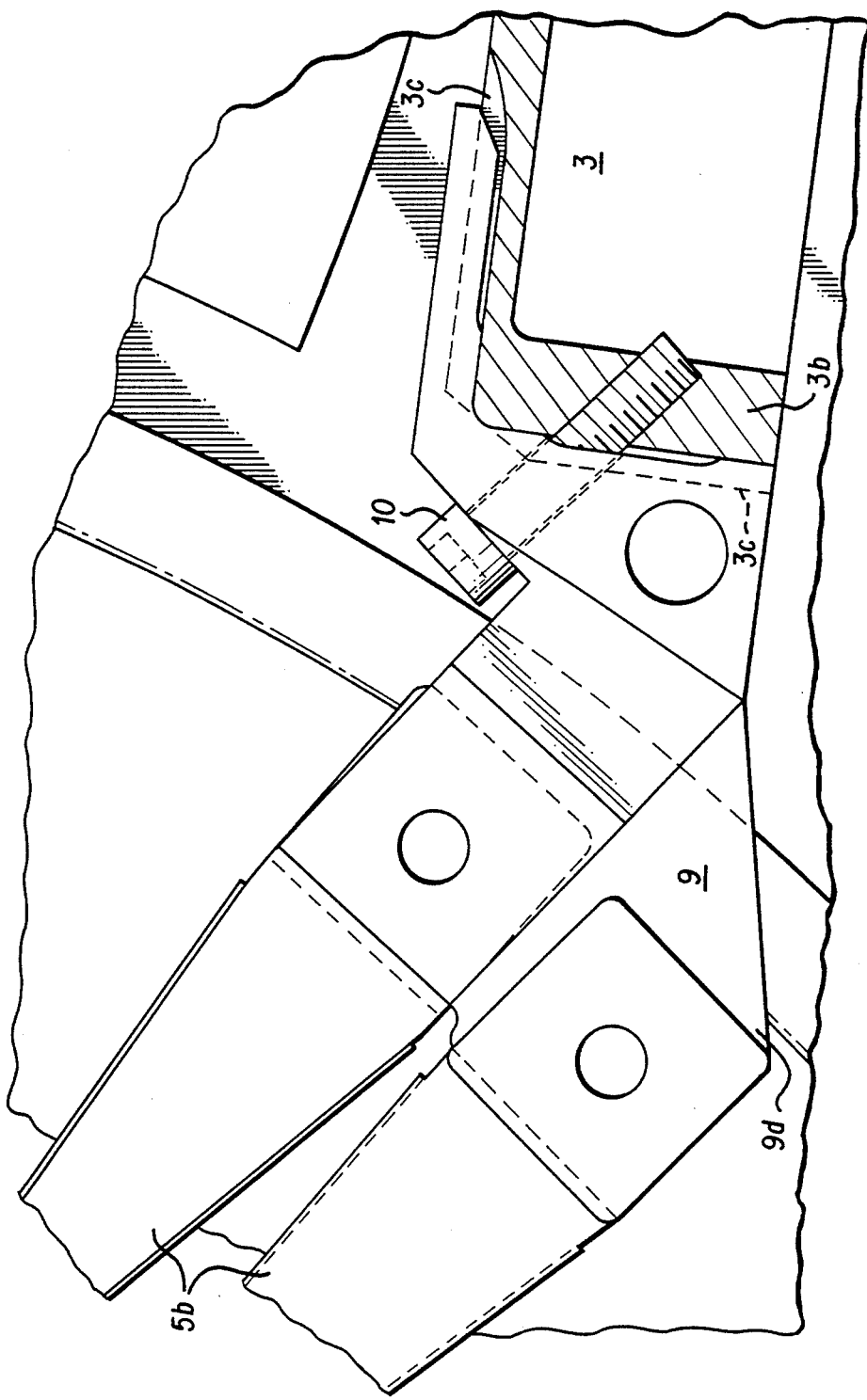
FIG. 4 is an enlarged, fragmentary plan view of the armstack including the comb structure of the rotary actuator.

Crash stop or limit stop members 9b on the opposite faces of each flexure mounting plate, adjacent the bases 9a, are designed to fit between the confronting faces of adjacent disks with a slight clearance. A projecting plate section 9c on each flexure mounting plate 9, having upper and lower faces 9d and 9e, centered about a central axis, or central plane, of the flexure mounting plate, provides mounting surfaces for the wide ends or bases flexures 5b as seen in FIGS. 4 and in FIG. 1. One flexure 5b is mounted on the face 9e on the bottom side of the projection 9c, and the lower of the two flexures 5b, seen in FIGS. 1 and 4, is mounted on the top side of the projection 9c on the surface 9d. They are circumferentially spaced in side-by-side relationship, as seen in FIGS. 1 and 4.

Magnetic heads 5c are mounted on the narrow ends or tips of the flexures 5b in circumferentially spaced positions, by means of leaf springs 5d of lightweight construction, which lightly bias the magnetic heads into contact with the confronting disk surfaces. It will be observed from FIG. 1 that one magnetic head 5c faces downwardly and the other magnetic head 5c faces upwardly. In this position, the magnetic heads are gently biased against the confronting surfaces of the adjacent disks between which they are fitted. The flexures 5b are shallow channels, the channel sections extend over the tapered portions of the flexures but do not extend into the flexure bases or into the area where the flexures are mounted, thus providing flexibility of the flexures adjacent the mounting pads or surfaces 9d and 9e. A head plate 5e and a center hole attachment, such as a rivet or screw, secures each flexure to its mounting surface 9d or 9e on the projection 9c.

The magnetic heads are circumferentially spaced and radially displaced. Unlike the linear actuator disk drive of FIG. 6, the rotary actuator disk drive does not move the heads along a radial line but rather along an arc displaced from a radial line. There is only one track position where the heads can be aligned on a single track. For the head position relationship shown, the outer track is the selected track. Other tracks, including the inner track, are used for head alignment depending upon drive geometry. Corrections for head positions when selecting one or the other heads during track seeking or track following are progressive from this outer track moving inwardly, or for any selected track, and are easily programmed.

As seen in FIG. 1, angular movement of the actuator arm 3 is limited between the fixed stops 2 which are secured in the permanent magnet structure 7. Between these extremes of positions, track seeking and track following operations of the disk drive take place.

Figure 5:
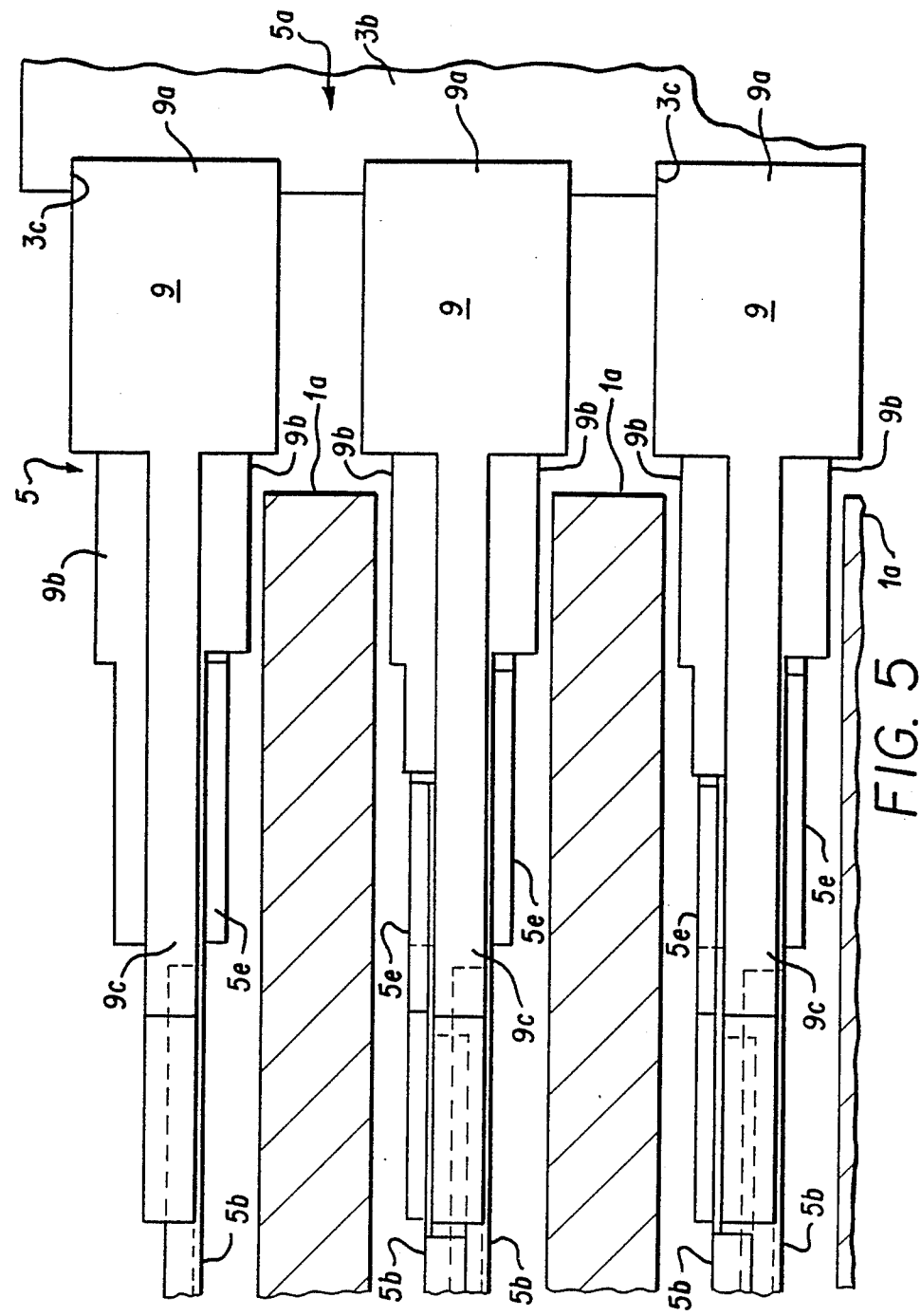
FIG. 5 is an enlarged end view of the actuator comb and armstack structure, viewed as seen on the line V—V of FIG. 1.

The vertical displacement limit stop of this invention functions to avoid damage to the surfaces of the disks in which data and servo code have been recorded. The vertical limit stop is intended to function during non-operating periods of the disk drive, particularly when the disk drive is being handled for removal or installation or when being transported. In such non-operating periods, the actuator arm 3 is positioned and locked, as seen in FIG. 1, so that the magnetic heads 5c are in a parked position between the innermost track of data and servo code recording and the center of the disk and also outside of any flying area of the magnetic heads. In this position, as seen in FIGS. 1, 4 and 5, the limit stop members or projections have face portions which are disposed between the confronting surfaces of adjacent disks, overlapping an outer peripheral surface of each disk adjacent the peripheral edge thereof. Referring to FIG. 5, particularly, it will be seen that the faces of the limit stop members 9b which confront the adjacent surfaces of the disks are higher than any of the face parts of the head plates 5e and center attachments of the head plates to the projection 9c, which may contact a disk surface. With this arrangement, shock forces applied to the disk drive in handling, having force components acting on disks 1a and of a magnitude sufficient to effect relative movement between the armstack and the disk to bring the disks in contact with armstack projections therebetween, result in contact only between an outer peripheral surface of a disk and the surface of an adjacent limit stop member 9b outside of the outer data track of a disk, and outside of the flying area of a magnetic head, at such outer track location. By this expedient, contact between surface parts of the armstack and an adjacent surface of a disk, within the data area of the disk, is obviated.

Figure 6:
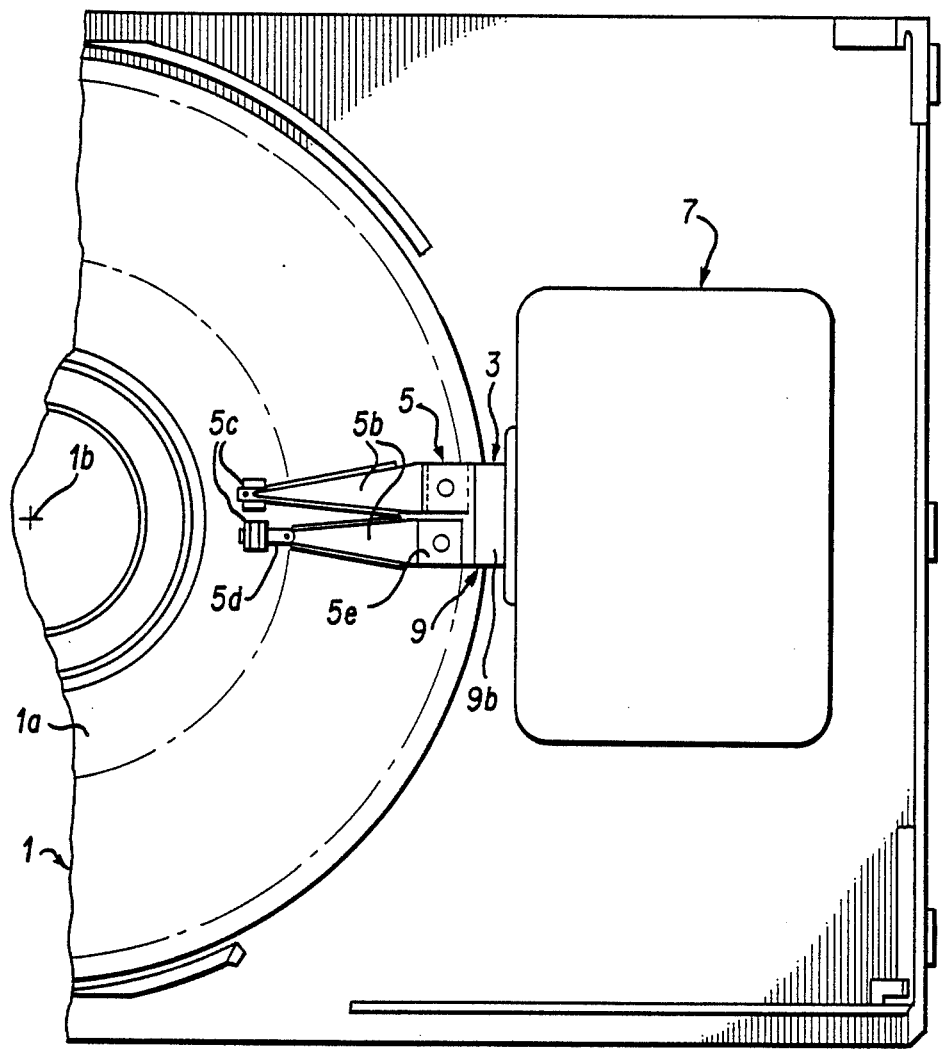
FIG. 6 is a plan view of another embodiment of this invention showing the vertical limit stop installation on a linear armstack actuator structure, in a disk memory drive.

This invention is not limited to armstack installations associated only with rotary actuators, such as that illustrated herein, but is equally applicable to armstack installations on linear actuators. For example, in FIG. 1, a linear actuator might be connected to the armstack 5 to stroke along a center line extending between and longitudinally of the flexures 5b in which case the linear actuator is connected to the flexure mounting plate 9. FIG. 6 illustrates such an arrangement. In FIG. 6, parts having the same function as those of FIG. 1 bear the same reference characters. The magnetic driver 7 is a conventional linear driver and strokes the linear actuator 3 along a disk radial line. The heads 5c are equally radially positioned in spaced circumferential positions. Equal radial spacing of the heads is possible, because with the linear actuator head motion across the tracks is along a radial line and head alignment on each track takes place. The flexures 5b and flexure mounts on the member 9 are the same. Otherwise, the discussion of FIG. 1 applies generally here.

Figure 7:
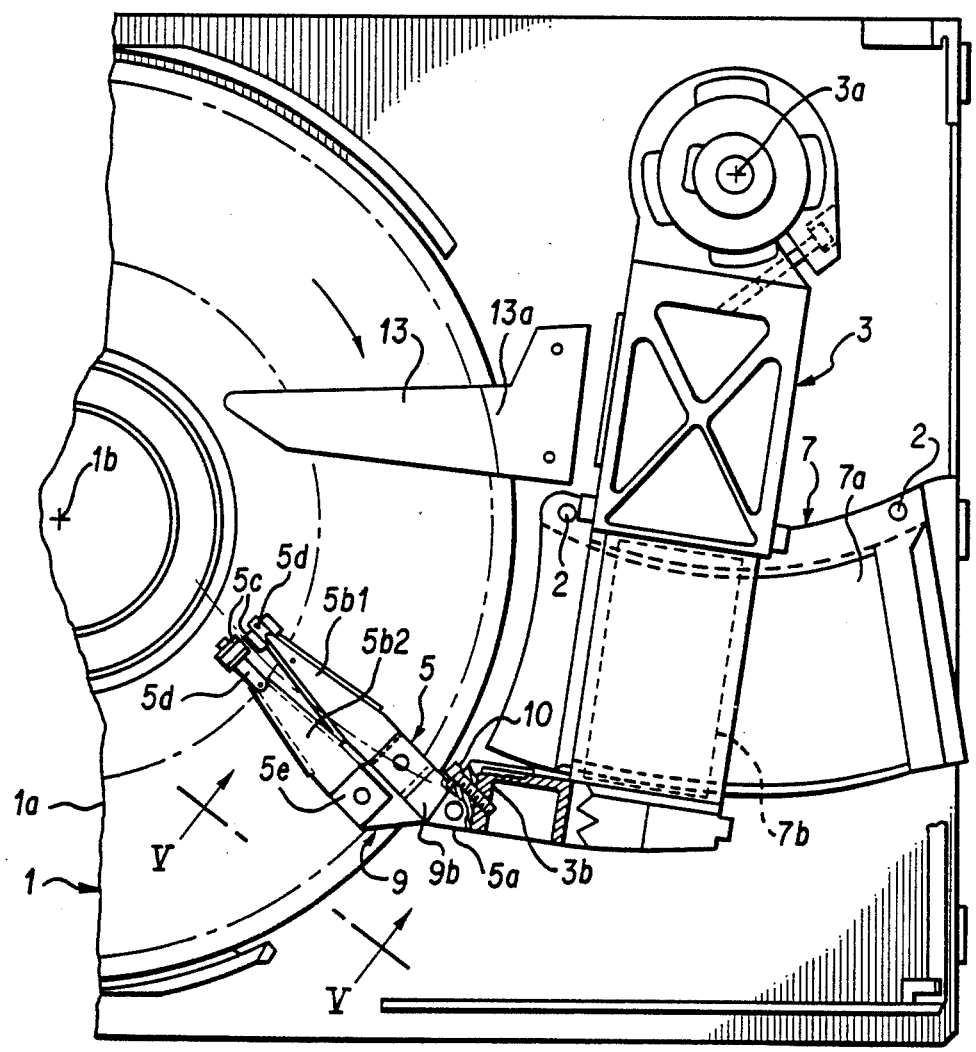
FIG. 7 is a plan view of a further embodiment of this invention.

The application of this limit stop system in disk drives is not limited to armstacks but may be applied to any item or device projecting between the disks, usually for the performance of some disk drive work function in association with an adjacent disk surface. Such an application is shown in FIG. 7. Here, a vane projects between adjacent disks. These vanes may be attached to any fixed portion of the housing of the disk drive and are here shown as being fixed to the base of the disk drive. Such vanes are used in some instances to introduce turbulence in the airflow upstream of the magnetic heads. This has been found to improve magnetic head performance. In such an application, the opposite faces, that is the upper and lower faces of the vane, are each disposed in close proximity to the confronting surface of an adjacent disk. Thus, relative movement due to shock between the disks and the vanes can cause contact of a vane surface with the data track area of the disk. This can be obviated by providing limit stop members on the vanes 13a, such as the limit stop members 9b on the flexure mounting plate 9, at an outer peripheral surface of the disk, so that contact between the surface of the limit stop 13a and the adjacent surface of the disk prevents contact of a vane with the data area of the disk.

It will be apparent from the foregoing that this limit stop principle is applicable to any structure projecting between adjacent disks whatever its purpose may be.

Drop testing of a disk drive of the type of FIG. 1 has been accomplished. The target was 90 G's, 3 ms. The drop tests were made with the disk drive attached to a rigid table. The rigid table was dropped onto a one-quarter inch thick piece of felt on a rigid surface. Vertical drops resulted shock forces which acted in directions causing relative motion between the disks and the armstack. A compliant mount suspended the disk stack and the actuator arm and armstack structure in the disk drive housing. Drop tests were conducted over drop distances between ¾ in. and 2 in. All were successful. The test results over drop distances from 1½ in. to 2 in. are presented in Table 1 below. No disabling disk damage resulted from these tests. Only a slight smudge was noticed at the edge of a disk where impact had taken place with a limit stop face. The disk drive remained operational.

TABLE 1

| DROP DIS-TANCE | TABLE IMPACT | DISK DRIVE RESPONSE | SHOCK DURATION ½ SINE | VELO-CITY CHANGE |
|---|---|---|---|---|
| 1⅛ IN. | 78.3 G's | 82.4 G's | 3.32 ms | 49.4 IPS |
| 1⅜ IN. | 82.3 G's | 86.0 G's | 3.11 ms | 49.8 IPS |
| 1⅝ IN. | 87.23 G's | 90.6 G's | 3.07 ms | 52.8 IPS |
| 1⅞ IN. | 87.35 G's | 96.4 G's | 3.07 ms | 52.4 IPS |
| 2 IN. | 94.5 G's | 105.76 G's | 2.93 ms | 55.5 IPS |

What is claimed is:

1. A vertical displacement limit stop structure for a disk memory drive, comprising:
   a. a plurality of magnetic memory disk coaxially mounted along and rotatably mounted about a common central axis, each memory disk having concentric tracks of magnetic recordings in its opposite surfaces;
   b. work function members projecting between adjacent disks for preforming a work function in association with said disks, said members each having opposite face parts, said face parts being respectively disposed in close proximity to a confronting surface of an adjacent disk adjacent a peripheral edge thereof, each face part and the confronting disk surface being subject to unwanted contact due to relative displacement between the disks and the work function members toward one another due to inertial reactions in response to accelerations which cause displacement; and
   c. a vertical displacement limit stop on each of the opposite sides of each work function member, having an impact face projecting toward an adjacent disk surface beyond said face parts to make contact with said confronting face of the disk at a radial position overlapping the disk surface at the peripheral edge of the disk, outside of the tracks of magnetic recordings.

2. A vertical displacement limit stop structure according to claim 1, in which: each limit stop structure comprises a material forming said impact face which is softer than the surface of said disk adjacent the peripheral edge of the disk.

3. A limit stop structure according to claim 1, in which said work function members each comprise:
   a. a moveable arm assembly having a moveable arm projecting between adjacent disks;
   b. at least one magnetic head on each moveable arm, disposed to move across the tracks of magnetic recordings in the confronting surface of the adjacent magnetic disks, upon movement of said moveable arm;
   c. the impact faces of the vertical displacement limit stops on each side of each moveable arm being positioned on each movable arm to move between adjacent disks in confronting relation to adjacent disk surfaces when said magnetic head approaches an inner radial limit position beyond said tracks of magnetic recordings.

4. A vertical displacement limit stop structure according to claim 3, in which said moveable arm assembly, comprises:
   means for simultaneously moving each moveable arm linearly in a radial direction with respect to said disks.

5. A vertical displacement limit stop structure according to claim 3, in which said moveable arm assembly, comprises:
   means for simultaneously rotatably moving each moveable arm and a magnetic head thereon, moving said magnetic head across the tracks of magnetic recordings.

6. A vertical displacement limit stop structure according to claim 1, in which said work function members each comprise:
   a. a vane projecting between adjacent disks;
   b. the impact faces of said vertical displacement limit stops being each disposed on opposite sides of each vane in a position overlapping a disk surface adjacent the peripheral edge of the disk outside of tracks recorded on the disk.

* * * * *